United States Patent [19]

Frazee

[11] Patent Number: 4,845,149
[45] Date of Patent: Jul. 4, 1989

[54] PRESSURE SENSITIVE ADHESIVE COMPOSITIONS

[75] Inventor: Glenn R. Frazee, Kenosha County, Wis.

[73] Assignee: S. C. Johnson & Son, Inc., Racine, Wis.

[21] Appl. No.: 119,282

[22] Filed: Nov. 4, 1987

Related U.S. Application Data

[63] Continuation of Ser. No. 899,282, Aug. 22, 1986, abandoned.

[51] Int. Cl.$^4$ .............. C08F 2/16; C08F 2/00
[52] U.S. Cl. .................. 524/458; 524/460; 526/203; 427/208.4
[58] Field of Search ............ 526/203; 427/208.4; 524/458, 460

[56] References Cited

U.S. PATENT DOCUMENTS

| | | | |
|---|---|---|---|
| 3,644,258 | 2/1972 | Moore et al. | 524/556 |
| 3,784,498 | 1/1974 | Ceska | 260/29.6 TA |
| 3,970,626 | 7/1976 | Hurst et al. | 524/556 |
| 4,151,143 | 4/1979 | Blank et al. | |
| 4,172,122 | 10/1979 | Kubik et al. | 424/59 |
| 4,173,669 | 11/1979 | Ashida et al. | 524/556 |
| 4,179,417 | 12/1979 | Sunada et al. | |
| 4,373,077 | 2/1983 | Boeder | 526/309 |
| 4,395,499 | 7/1983 | Rosenski et al. | 524/556 |
| 4,414,370 | 11/1983 | Hamielec et al. | |
| 4,529,787 | 7/1985 | Schmidt et al. | |
| 4,540,736 | 9/1985 | Herten et al. | 524/556 |
| 4,546,160 | 10/1985 | Brand et al. | |
| 4,668,730 | 5/1987 | Iovine et al. | |

FOREIGN PATENT DOCUMENTS

| | | | |
|---|---|---|---|
| 814528 | 6/1969 | Canada. | |
| 53-84091 | 7/1978 | Japan | 524/819 |

OTHER PUBLICATIONS

Advances in Chemistry Series 125, ACS, (1973), Washington, D.C., Nakajima, pp. 98–107.

*Primary Examiner*—Joseph L. Schofer
*Assistant Examiner*—N. Sarofim

[57] ABSTRACT

Emulsion polymer pressure sensitive adhesives are disclosed which have substantially Newtonian-like flow characteristics.

7 Claims, No Drawings

PRESSURE SENSITIVE ADHESIVE COMPOSITIONS

This is a continuation of application Ser. No. 899,282, filed Aug. 22, 1986 now abandoned.

BACKGROUND OF INVENTION

The present invention relates to pressure sensitive adhesive compositions. In particular, an acrylic emulsion polymer is employed as the polymeric component of a pressure sensitive adhesive formulation. The acrylic emulsion polymer has substantially Newtonian-like flow characteristics.

Pressure sensitive adhesives (PSAs) are a class of adhesive compositions which are applied with pressure, usually finger pressure, and generally do not undergo a liquid to solid transition in order to hold materials together. PSAs can be solvent-free natural or synthetic resins having a viscoelastic property termed tack. Tack is a property characterized by the rapid wetting of a substrate by a polymer to form an adhesive bond upon brief contact with the substrate under light pressure. Typical applications for PSAs include pressure-sensitive tapes, labels, decals, decorative vinyls, laminates, wall coverings and floor tiles.

The early pressure sensitive tapes used adhesives that were based on organic solvent solutions of natural or synthetic rubber, tackified by a resinous material. Later, the rubber in pressure sensitive adhesives was replaced with styrene-butadiene block copolymers. More recently, the polyacrylates have gained wide acceptance in pressure sensitive adhesive formulations due to their clarity and resistance to oxidation and sunlight.

Acrylic copolymer PSAs are available as solution or aqueous emulsion polymers. The solution polymers have the disadvantages of low molecular weight due to chain transfer during the polymerization, viscous solutions at higher molecular weights, and the need for elaborate coating processes and solvent recovery equipment to satisfy economic and environmental requirements. The anionic and nonionic emulsifiers generally employed in acrylic emulsion polymerization protect the soft pressure sensitive polymers from impact coalescence during the reaction and stabilize the latex for satisfactory mechanical and storage stability. However, the emulsifiers do have adverse effects on pressure sensitive adhesive properties. The emulsifiers employed in emulsion polymerization adversely effect water resistance, tack and adhesion properties of emulsion polymer adhesives.

Canadian Pat. No. 814,528, issued June 3, 1969, discloses low molecular weight alkali soluble resins, resin cuts and methods for their preparation and purification. The resins are disclosed as being especially useful as emulsifiers, leveling agents and film-formers. The number average molecular weight of the resins range from 700–5000 and the resins have acid numbers between 140 and 300. The resins are disclosed as emulsifiers in the preparation of emulsion polymers resulting in emulsion polymers which are stable and substantially free from coagulum. For use as an emulsifier in emulsion polymerization reaction, the resins must have a number average molecular weight between 1,000 and 2,000 and preferably between 1,000 and 1,500. Resins having a number average molecular weight greater than 2,000 result in unstable and coagulated emulsion polymers when used as the emulsifier in emulsion polymerization reactions.

The present invention provides advantages over known acrylic copolymer adhesives by providing an improved pressure-sensitive adhesive formulation having (a) fine particle size emulsions, (b) emulsion viscosities which can be varied from low to high with no sacrifice in stability, (c) emulsion viscosities which are stable under high shear conditions encountered in roll coating operations (Newtonian-like flow characteristics) and (d) low foam production which is desirable in roll coating operations.

SUMMARY OF THE INVENTION

Briefly, in accordance with the present invention, an improved acrylic pressure sensitive adhesive is prepared by using an acrylic emulsion polymer made in the presence of a support resin. The acrylic emulsion polymer is a polymer containing one or more vinylic monomers wherein at least 40% by weight of the polymer is an alkylacrylate. The support resin can be any alkali soluble or alkali dispersible polymer containing one or more vinylic monomers wherein the support resin has:

(a) a pH of greater than about 7;

(b) at least about 6% by weight of a polymerizable carboxylic acid, an acid anhydride or esters or partial esters of inorganic acids in the resin backbone;

(c) an acid number of at least about 30; and (d) a number average molecular weight of from about 1,000 to about 15,000.

The acrylic emulsion polymer adhesive of the present invention is prepared by an emulsion polymerization technique wherein the support resin is employed as the emulsifying agent. However, minor amounts of traditional emulsifying agents may be used.

In the preparation of the present acrylic emulsion polymers, the support resin and alkaline materials such as alkali metal hydroxides, amines, etc. or ammonia are added to a suitable reaction vessel with water to form a solution of dispersion of the support resin therein. Optionally, a minor amount of a nonionic or anionic surfactant can be added to the reaction mixture. A minor amount, i.e., about 10%, of the premixed monomers employed in the acrylic polymer are added to the reaction vessel with agitation. A short time thereafter, i.e., 5–10 minutes, an initiator is added to the reaction mixture followed by the slow addition of the remaining monomer mixture over a 1 to 2 hour period.

The emulsion polymerization reaction is usually conducted under an inert atmosphere, i.e., nitrogen, and at an elevated temperature, i.e., 70°–105° C., when thermal initiators are employed. When redox initiators are employed then the reaction can be conducted at temperatures as low as about −3° C. The reaction mixture is maintained under sufficient agitation to thoroughly mix the components during the reaction. After the reaction, the acrylic emulsion polymer is filtered to remove large particles.

The acrylic emulsion polymer prepared according to the above-described procedures can be used neat as a pressure sensitive adhesive or can be admixed with standard pressure sensitive adhesive ingredients such as dyes, preservatives, tackifiers, perfumes, coalescing solvents and leveling aids.

Of particular interest in the practice of the present invention, an acrylic emulsion polymers is employed which contains from 40–90 weight percent 2-ethylhexylacrylate (2-EHA), butylacrylate (BA), isooctylacrylate, isodecylacrylate or mixtures thereof, made in the presence of a support resin containing butylacrylate and acrylic acid and having a number average (Mn) molecular weight in the range of 2,000–2,300.

The acrylic pressure sensitive adhesives according to the present invention have excellent flow, coating and leveling characteristics especially on low energy surfaces and on high speed equipment. The present acrylic emulsion polymers are characterized by near Newtonian flow and are slightly translucent.

DETAILED DESCRIPTION OF INVENTION

In practicing the present invention, it is essential to employ an acrylic emulsion polymer containing at least about 40% by weight of an alkylacrylate monomer which is polymerized in the presence of an alkali soluble or alkali dispersible support resin. The support resin solution or dispersion must have:

(a) a pH of greater than about 7;

(b) at least about 6% by weight of a polymerizable carboxylic acid (acrylic acid, methacrylic acid), an acid anhydride (maleic anhydride) or ester or a partial ester of an inorganic acid (sulfuric, phosphoric, sulfonic, phosphonic) in the resin backbone;

(c) an acid number of at least about 30; and (d) a number average molecular weight of from about 1,000 to about 15,000.

The support resin performs the function of the emulsifiers used in standard emulsion polymerization techniques. Optionally, however, the support resin can serve as the major amount of emulsifier; and a minor amount of nonionic or anionic emulsifiers can be present in the emulsion polymerization reaction. The support resin is comprised of one or more vinyl monomers, i.e., acrylic acid and esters and derivatives thereof, methacrylic acid and esters and derivatives thereof, styrene, alphamethyl styrene, vinyl toluene and the like with the proviso that there must be at least about 6% by weight of a polymerizable carboxylic acid, an acid anhydride or an ester or a partial ester of an inorganic acid (partial esters of sulfuric acid, phosphoric acid, sulfonic acid or phosphonic acid) in the resin backbone. Preferably there is at least about 6% by weight of acrylic acid or methacrylic acid in the resin backbone. The resin must be soluble or dispersible in an alkali solution and when the support resin is added to the reaction mixture, the total system must be kept at a pH of at least about 7. The resin must have an acid number of at least about 30, advantageously about 100–300 and preferably about 150–200. When used herein, the term "acid number", when referring to the support resin, indicates the number of milligrams (mg) of KOH required to neutralize one (1) gram of resin. The molecular weight of the support resin should be in a range of from about 1,000 to about 15,000, and advantageously from about 1,800 to about 3,600 and preferably from about 2,000 to about 2,300. The percentage of total solids the support resin represents in the final emulsion is from about 10 to about 40% by weight and preferably from about 25 to about 35% by weight.

The acrylic emulsion polymer component of the present adhesive represents from about 60 to about 90% by weight of the total solids. The term "solids" when used herein, refers to the total weight of non-volatile components. The acrylic emulsion polymer of the present invention is a polymer comprising one or more vinylic monomers wherein at least about 40% by weight of the polymer is an alkylacrylate monomer or mixtures of alkylacrylate monomers having an alkyl group with from 2 to 20, and preferably 4 to 10, carbon atoms. Preferred alkylacrylate monomers include 2-ethylhexylacrylate (2-EHA), butylacrylate (BA), isooctylacrylate (IOA), isodecylacrylate (IDA) or mixtures thereof.

The vinylic monomers employed in the acrylic emulsion polymer in addition to alkylacrylate can be any vinylic monomer which does not reduce the pH of the reaction mixture to below about 7. These vinylic monomers are copolymerized with the alkylacrylte to modify the properties of the resulting pressure sensitive adhesives according to the end-use applications and are readily determinable to one skilled in the art. Divinyl monomers can be used to increase the molecular weight and the internal strength of the polymer backbone and are generally employed in amounts less than about 7% by weight of the acrylic polymer. Suitable vinylic monomers employed in the practice of the present invention include styrene (ST), alpha methyl styrene (AMS), tetraethylene glycol diacrylate (TEGDA), hydroxyethyl methacrylate (HEMA), methylmethacrylate (MMA), ethylacrylate (EA), methylacrylate (MA), propylacrylates (PA), propylmethacrylates (PMA), hexylacrylates (HA), hexylmethacrylates (HMA), and vinyl acetate.

The total solids of the acrylic emulsion polymer can vary from about 15 to about 60 weight percent based on the total weight of the emulsion mixture. Advantageously, the total solids content is from about 30–58 and preferably 48–53% by weight.

The present acrylic emulsion polymers are prepared employing standard emulsion polymerizaton techniques with the exception that the support resin is employed as the emulsifying agent or, alternatively, as the major portion of the emulsifying agent, i.e., a minor amount of nonionic or anionic emulsifiers can be employed in combination with the support resin. To prepare the present acrylic emulsion polymers, the support resin is admixed with about 90% of the water to be employed in the reaction. An alkaline material such as ammonia, alkali metal hyroxide, amine, etc. is added to the water and support resin to dissolve or disperse the support resin. The reaction is conducted at a temperature suitable for the initiator being employed, i.e., 70°–105° C. for thermal initiators and as low as −3° C. for redox initiators.

After the support resin has been dissolved in the water and this mixture is brought to reaction temperature, the minor amount of emulsifier, if employed, is then added to the reaction mixture. A minor portion of the vinylic monomer mixture is then added to the reaction mixture with agitation and held for a short period of time (5 to 10 minutes). The initiator, dissolved in the remaining water, is then added to the mixture of support resin and monomer with agitation and held for a short period of time, usually 5 to 20 minutes. The remaining monomer mixture is then slowly added to the reaction mixture over an extended period of time usually from about ½ hour to about 2 hours. During the reaction, the reaction mixture is constantly maintained in an agitated state to provide a thorough mix of components. The reaction is conducted under an inert atmosphere such as nitrogen. After the addition of the remaining monomer mixture, the reaction mixture is maintained at reaction temperature for an additional period of time, usually from about ½ hour to about 2 hours. Thereafter, the resulting emulsion polymer is cooled to 25° C., filtered and stored in a suitable container.

The initiators employed in the emulsion polymerization reaction are not critical to the practice of the present invention. The initiator can be water-soluble or oil-soluble and can be a thermal initiator or a redox initiator. Any water soluble material that can generate a free radical is preferably used as the initiator. The free radical initiators include various peroxygen compounds such as persulfates, tert-butyl hydroperoxide and similar peroxide catalysts and azo compounds, such as azobis-isobutylnitrile and dimethyl azobis-isobutyrate. Other initiator systems include (1) alkali metal persulfate or ammonium persulfate with or without reducing agents adapted to activate the sulfate and (2) the oil soluble initiator ditertiary butyl peroxide. The free radical initiators are ordinarily present in the reaction at a level of from about 0.01 to about 2% by total weight of the reaction mixture.

An emulsifying agent can optionally be added as a minor component of the emulsifier system in the present reaction. The particular emulsifying agent employed is not critical to the practice of the present invention. The standard emulsifiers used for emulsion polymerization processes are acceptable. The emulsifiers include nonionic and anionic surfactants. Mixtures of various surfactants can also be employed. Suitable nonionic surfactants include (1) ethylene oxide derivatives of alkylphenols, such as octylphenoxy polyethoxyethanol and nonylphenoxy polyethoxyethanol, both commercially available under the TRITON and SURFONIC brand names; (2) long chain ethoxylated alcohols such as linear or branched $C_6$-$C_{15}$ primary alcohol ethoxylates, commercially available under the NEODOL and ALFONIC brand names; (3) the PLURONIC series of block copolymer surfactants which are commercially available from BASF Wyandotte; and (4) polyalkylene glycols, such as polypropylene glycol having a average molecular weight of from about 800 to about 2,000. A preferred nonionic emulsifier is polypropylene glycol having an average molecular weight of about 1,200 which is commercially available from The Dow Chemical Company as POLYGLYCOL P-1200.

Suitable anionic surfactants include (1) alkyl sulfates such as lauryl sulfate; (2) esters of sulfonated dicarboxylic acid, especially succinic acid. A preferred anionic surfactant is Dowfax 2A1 brand sodium dodecyl diphenyloxide disulfonate.

Once prepared, the present acrylic emulsion polymers can be used neat as pressure sensitive adhesives. Alternatively, other pressure sensitive adhesive ingredients can be added to the present acrylic emulsion polymers to provide a pressure sensitive adhesive with desired properties. These pressure sensitive adhesive ingredients include tackifiers, dyes, preservatives, leveling aids, coalescing solvents, perfumes, and the like. These optional ingredients are well known to one skilled in the art and are employed in concentrations readily determinable by one skilled in the art.

The PSA compositions of the present invention are used in any pressure sensitive application. Such applications include, tapes, stickers, labels, decals, decorative (especially wood grain) vinyls, laminates, wall coverings and floor tiles. The present acrylic emulsion polymer PSAs have substantially Newtonian-like flow characteristics and have desirable flow, coating and leveling characteristics on low energy surfaces. Additionally, the present acrylic emulsion polymer PSAs are useable on high speed equipment.

The following ingredients are admixed to prepare a preferred embodiment of the present invention:

| Ingredients | Weight % Range | Preferred |
|---|---|---|
| Support resin (BA/AA, $M_n$ = 2,000-2,300) | 0.75-15 | 11-14 |
| Ammonia | 2-5 | 2-5 |
| Nonionic surfactant | 0.5-5 | 0.5-5 |
| Initiator | 0.01-2 | 0.01-2 |
| Monomer mixture (at least 40% 2-EHA) | 14.25-57 | 35-50 |
| Water | Balance | Balance |

In an especially preferred embodiment, the support resin comprises a BA/AA copolymer having an $M_n$ of between 2,000 and 2,300 and a BA/AA weight ratio of about 70/30, respectively, and the acrylic emulsion polymer comprises at least 70 weight percent 2-EHA in combination with any one or more of the following monomers: BA, ST, AMS, MMA, HEMA and up to about 7 percent by weight TEGDA.

The following examples illustrate the practice of the present invention but should not be construed as limiting its scope. All percentages are by weight unless specified otherwise.

EXAMPLE 1

The following ingredients were admixed according to the procedures described below to make an acrylic emulsion polymer pressure sensitive adhesive of the present invention:

| PSA FORMULATION 1 | |
|---|---|
| Ingredients | Weight % |
| Support resin (solution resin BA(70%)/AA(30%); $M_n$ = 2,000) | 11.93 |
| Aqueous ammonia | 2.39 |
| POLYGLYCOL P-1200 brand polypropyleneglycol nonionic surfactant | 0.48 |
| Ammonium persulfate initiator | 0.25 |
| Monomer mixture MMA(10)/2-EHA(77)/BA(10)/TEGDA(3) | 35.81 |
| Deionized water | 49.14 |

The support resin, admixed with 90% of the deionized water, and all of the aqueous ammonia were charged to a 4-neck flask equipped with a reflux condenser, thermometer, stirrer, addition funnel and a nitrogen gas inlet. The reaction mixture was stirred and heated to 85° C. under a nitrogen atmosphere. When the temperature reached 85° C., the nonionic surfactant was added to the flask with moderate (small vortex present) stirring for 5 minutes. Ten (10%) percent of the monomer mixture was then added to the flask with good agitation for 5 minutes while maintaining a temperature of 85° C. The ammonium persulfate initiator was dissolved in the remaining deionized water and added to the flask with agitation. After a slight drop in temperature, the reaction temperature was brought back to 85° C. for 10 minutes. The remaining monomer mixture was fed into the flask over a one-hour period while maintaining a temperature of 85° C. After the monomer addition, the reaction mixture was maintained for one hour at 85° C. with good agitation. The reaction mixture was then quickly cooled to 25° C. and the emulsion polymer was recovered.

The emulsion polymer of PSA Formulation 1 was then tested for adhesion properties according to routine standardized tests. No optional PSA ingredients were added to Formulation 1 to conduct these adhesion tests. Formulation 1 had a shear of 500 minutes (PSTC-7), a peel strength of 5 pounds per lineal inch (5 pli) (PSTC-11 modified for 24 hour dwell times) and a tack of 750 grams (g) (A-1-1 on a Polyken probe tack tester).

EXAMPLE 2

Employing substantially the same procedures described in Example 1, the following ingredients were employed to prepare PSA Formulation 2:

| PSA FORMULATION 2 | |
|---|---|
| Ingredients | Weight % |
| Support resin (solution resin BA(70)/AA(30); $M_n$ = 2,000–2,200) | 13.03 |
| Aqueous ammonia | 3.82 |
| Polypropylene glycol nonionic surfactant (POLYGLYCOL P-1200) | 0.61 |
| DOWFAX 2A1 anionic surfactant | 0.08 |
| Ammonium persulfate (APS) initiator | 0.27 |
| Monomer mixture MMA(10)/2-EHA(77)/BA(10)/TEGDA(3) | 39.08 39.08 |
| Deionized water | 43.11 |
| PSA Formulation 2 had the following adhesion properties: | |
| Peel | 3.6 pli |
| Shear | 900 min. |
| Tack | 600 g (A-1-1) |

EXAMPLE 3

Employing substantially the same procedures described in Example 1, the following ingredients were employed to prepare PSA Formulation 3:

| PSA FORMULATION 3 | |
|---|---|
| Ingredients | Weight % |
| Support resin (solution resin BA(70)/AA(30); $M_n$ = 2,000–2,200) | 11.97 |
| Aqueous ammonia | 2.39 |
| DOWFAX 2A1 anionic surfactant | 0.24 |
| APS initiator | 0.25 |
| Monomer mixture 2-EHA(77)/BA(10)/HEMA(10)/TEGDA(3) | 35.9 35.9 |
| Deionized water | 49.26 |
| PSA Formulation 3 had the following adhesion properties: | |
| Peel | 4.0 pli |
| Shear | 3500 min. |
| Tack | 500 g (A-1-1) |

EXAMPLE 4

Employing substantially the same procedures described in Example 1, the following ingredients we employed to prepare PSA Formulation 4:

| PSA FORMULATION 4 | |
|---|---|
| Ingredients | Weight % |
| Support resin (solution resin BA(65)/AA(20)/ST(15); $M_n$ = 2,000–2,200) | 9.95 |
| Aqueous ammonia | 2.23 |
| Polypropylene glycol nonionic surfactant (POLYGLYCOL P-1200) | 0.53 0.53 |
| APS initiator | 0.21 |
| Monomer mixture ST(31)/2-EHA(54.21)/MMA(7.22)/ BA(7.22)/TEGDA(0.35) | 28.9 |
| Deionized water | 58.18 |

| -continued | |
|---|---|
| PSA FORMULATION 4 | |
| PSA Formulation 4 had the following adhesion properties: | |
| Peel | 2.5 pli |
| Shear | 8000 min. |
| Tack | 20 g (A-1-1) |

EXAMPLE 5

Employing substantially the same procedures described in Example 1, the following ingredients were employed to prepare PSA Formulation 5:

| PSA FORMULATION 5 | |
|---|---|
| Ingredients | Weight % |
| Support resin (solution resin BA(70)/AA(30); $M_n$ = 2,000–2,300) | 11.94 |
| Aqueous ammonia | 2.39 |
| Polypropylene glycol nonionic surfactant (POLYGLYCOL P-1200) | 0.48 |
| APS initiator | 0.25 |
| Monomer mixture MMA(10)/2-EHA(77)/BA(10)/TEGDA(3) | 35.81 |
| Deionized water | |
| PSA Formulation 5 had the following adhesion properties: | |
| Peel | 4.5 pli |
| Shear | 3800 min. |
| Tack | 500 g |

In similar operations, the various support resins and vinylic monomers described herein are employed in the preparation of acrylic emulsion polymer PSA compositions having desirable physical and mechanical properties.

I claim:

1. A method for preparing a polymer emulsion that can be utilized as a pressure-sensitive adhesive, the method comprising the steps of:

combining, in an agitated reaction vessel, an alkali-soluble or an alkali-dispersible polymeric resin with water and an effective amount of an alkaline material for forming either a resin-containing alkaline solution or a resin-containing alkaline dispersion, wherein at least about 6 weight percent up to about 30 weight percent of the polymeric resin is prepared from monomers selected from the group consisting of a polymerizable carboxylic acid, a polymerizable acid anhydride, and a polymerizable ester or a polymerizable partial ester of an inorganic acid, and wherein the polymer resin further includes a polymerizable vinyl monomer selected from the group consisting of acrylic acid esters and derivatives thereof, methacrylic acid esters and derivatives thereof, styrene, alpha-methyl styrene, vinyl toluene, and combinations thereof;

subjecting the agitated reaction vessel contents to an inert atmosphere and maintaining the agitated reaction vessel contents at a predetermined reaction temperature;

adding to the agitated reaction vessel a portion of an emulsion-polymerizable monomer mixture and thereafter adding an effective amount of an initiator for initiating emulsion-polymerization of the emulsion-polymerizable monomer mixture in the presence of the polymeric resin, wherein at least about 40 weight percent of the emulsion-polymerizable monomer mixture is selected from the group consisting of at least one alkyl acrylate monomer having an alkyl group with from 2 to 20 carbon atoms, styrene, alpha-methyl styrene, tetraethylene glycol diacrylate, hydroxyethyl methacrylate, methyl methacrylate, propyl methacrylate, hexyl methacrylate, vinyl acetate, and combinations thereof;

then adding to the agitated reaction vessel, over a time period of at least about ½ hour, the remainder of the emulsion-polymerizable monomer mixture; and thereafter, maintaining the agitated reaction vessel contents at the predetermined reaction temperature for a time period of at least ½ hour, for producing a polymer emulsion that can be utilized as a pressure-sensitive adhesive.

2. The polymer emulsion, utilizable as a pressure-sensitive adhesive, prepared in accordance with the method of claim 1.

3. The method in accordance with claim 1 wherein the alkaline material is selected from the group consisting of an alkali metal hydroxide, an amine, and ammonia.

4. The method in accordance with claim 1 wherein the resin-containing alkaline solution of the resin-containing alkaline dispersion has a pH of at least about 7.

5. The method in accordance with claim 1 wherein the polymeric resin has a number average molecular weight of about 1,000 to about 15,000.

6. The method in accordance with claim 1 and further including in the agitated reaction vessel, together with the polymeric resin, an emulsifying agent selected from the group consisting of a nonionic surfactant, an anionic surfactant, and combinations thereof.

7. The method in accordance with claim 1 further comprising cooling and filtering the produced polymer emulsion.

* * * * *